United States Patent [19]

Caporiccio et al.

[11] 4,080,319

[45] Mar. 21, 1978

[54] ELASTOMERIC COPOLYMIDES CONTAINING FLUORINE AND PROCESS FOR PREPARING SAME

[75] Inventors: Gerardo Caporiccio, Milan; Ezio Strepparola, Treviglio (Bergamo), both of Italy

[73] Assignee: Montedison S.p.A., Milan, Italy

[21] Appl. No.: 587,730

[22] Filed: Jun. 17, 1975

[30] Foreign Application Priority Data

Jul. 24, 1972 Italy ............................... 27342 A/72

[51] Int. Cl.$^2$ ...................... C08G 73/10; C08G 73/12
[52] U.S. Cl. .............................. 260/78 TF; 260/37 N; 260/47 CP; 260/63 HA; 260/65; 260/78 UA
[58] Field of Search ............... 260/78 TF, 47 CP, 65, 260/63 HA, 78 UA, 47 UA

[56] References Cited

U.S. PATENT DOCUMENTS

| | | | |
|---|---|---|---|
| 3,179,634 | 4/1965 | Edwards | 260/78 |
| 3,336,258 | 8/1967 | Angelo et al. | 260/78 TF X |
| 3,416,994 | 12/1968 | Chalmers et al. | 260/78 TF X |
| 3,423,365 | 1/1969 | Hoegger | 260/78 TF X |
| 3,436,372 | 4/1969 | Hoegger et al. | 260/78 TF X |
| 3,505,411 | 4/1970 | Rice | 260/615 |
| 3,810,874 | 5/1974 | Mitsch et al. | 260/75 H |

*Primary Examiner*—Lester L. Lee

[57] ABSTRACT

A new class of elastomeric copolymers the chains of which contain perfluoropolyether radicals having a linear structure linked through cycloimide groups to organic radicals of different and suitable structure is disclosed, as well as a process for preparing such copolymers which comprises condensing a mixture of fluorinated polyether diamines with one or more tetracarboxylic dianhydrides or esters.

10 Claims, No Drawings

ELASTOMERIC COPOLYMIDES CONTAINING FLUORINE AND PROCESS FOR PREPARING SAME

THE PRIOR ART

It is known that the aromatic polyimides obtained by reacting an aromatic diamine with a dianhydride of an aromatic tetracarboxylic acid are resins that as a rule are not adapted to after-treatments because they are either infusible or fusible only at temperatures above 400° C (N. A. Adrova, M. I. Bessonov, L. A. Laius, A. P. Rudakov, "Polyimides", Ed. IPST; Jerusalem (1969) pages 3, 83).

It is also known that it is possible to obtain polyimides having melting temperatures comprised between 300° C and 400° C, and glass transition temperatures between 100° C and 250° C by reacting a dianhydride of an aromatic tetracarboxylic acid with an aliphatic diamine.

Furthermore, it is known that the glass transition temperature of a polymer is important, since it is an essential characteristic from which it is possible to ascertain the temperature below which a polymer cannot exhibit the characteristics of a rubber.

Recently, there has been described a process for preparing a polyimide-amide film by the conventional method of hardening, at 200° C, a prepolymer synthesized by condensation of pyromellitio anhydride with 4,4-oxydianiline and a diamine having a polyfluoropolyether chain. From the reported description of certain properties of said product, it results that when subjected to the flexibility test at low temperatures [H. J. Stern, "Rubber, Natural and Synthetic", MacLaren & Sons, London (1967) pages 492–3], the polymer is bendable without breaking at −78° C (German patent application 2,145,176 filed Sept. 7, 1971).

Said polymer defined as elastomeric is really a plasticized plastic and is cross-linked as soon as it is prepared. The teaching of said application is of using a molar ratio of anhydride group/amine group different from the stoichiometric one (1:1) that would lead to a completely imide structure. The ratio used is 7.8/8.4, whereby the polymer shows a mixed polyimide-amide composition, is insoluble and unmeltable.

However, the mere property of elasticity or flexibility shown by a film thereof is not sufficient to classify a material as elastomeric; in fact, according to H. J. Stern, "Rubber, Natural and Synthetic", II Ed. MacLaren & Sons, London, 1967, page 466, the basic characteristics of an elastomeric material are: the form of the stress-strain curve in which a yield point is not present; a value of the Young's modulus of the order of $10^7$ dyne/cm$^2$; and an elongation at break comprised between 500% and 1,000%.

Furthermore, in order to insure the existence of the properties of elastic rebound in the elastomeric state, it is necessary [according to L. R. G. Treloar, "The p PHysics of Rubber Elasticity", II Ed. Oxford Clarendon Press (1958) pp 2, 12] to introduce some forms of restraint on the freedom of movement of the molecules in order to prevent the free flow of the material by the free movement of each macromolecule over the surrounding molecules. The necessary restraining crosslinkages between the macromolecules are introduced by the process of vulcanizaton. Thus, the indispensable property of elastic rebound of the elastomeric material can be maintained, notwithstanding prolonged stressing or solvent action.

THE PRESENT INVENTION

An object of this invention was to provide polymeric elastomeric materials having the structure of copolyimides and characterized by a high degree of flexibility and elasticity at temperatures even considerably below −80° C and exhibiting, in the vulcanized state, the properties of a rubber.

This and other objects as will appear are attained by the present invention which provides new elastomeric copolyimides the chains of which have a structure made up of repeating units represented by formula (1):

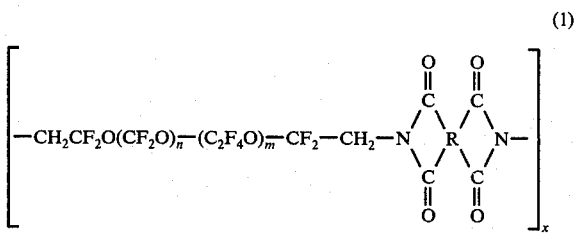

In formula (1) $C_2F_4$ is a group obtained by opening of the double bond of a tetrafluoroethylene molecule; $-C_2F_4O-$ and $-CF_2O-$ are oxyperfluoroalkylene units, which are contemporaneously present and randomly distributed along the chain; $n$ and $m$ are whole numbers from 4 to 100 and the sum $(n + m)$ is a number comprised between 20 and 200; the $m/n$ ratio is comprised between 0.2 and 5; radicals R are tetravalent organic radicals of at least two different structures, randomly distributed in the copolymeric chain and selected from the group comprising: aliphatic hydrocarbon radicals containing 2 to 18 carbon atoms, optionally substituted in the main chain by alkyl groups or by halogen atoms; alicyclic mono- or polycyclic hydrocarbon radicals, containing from 4 to 12 carbon atoms and optionally containing substituents selected from the group comprising halogen atoms, alkyl or phenyl radicals, alkylene or vinylene radicals, which latter ones may be in the position of bridges inside the cycle; aromatic or alkylaromatic hydrocarbon radicals or aromatic radicals having condensed rings or aromatic derivative consisting of 2 or more benzene rings either directly linked to one another or through a group constituted by an oxygen or sulphur atom or by a group $-NH-$, $-CO-$, $SO-$, $SO_2-$, the alkylene group, the alkylidene group, the vinylene group, the benzene rings being optionally substituted by halogen atoms or by phenyl groups; radicals R deriving from heterocyclic compounds having the ring made up of 5 or 6 atoms, such as, for example, pyrazine and pyrrolidine, furan, thiophene, provided that at least one of said radicals R belongs to the group consisting of aliphatic radicals, cycloaliphatic radicals, aliphatic substituted aromatic radicals and cycloaliphatic-substituted aromatic radicals.

The elastomeric products of this invention exhibit, among other valuable characteristics, several excellent properties such as high solubility, moldability, flexibility at low temperatures and good thermal and chemical stability at high temperatures, imparted by the copolymeric nature of the chains as well as by the chemical structure of the perfluoropolyether blocks of the copolymeric chain and by the particular thermal and chemical stability of the cycloimide groups which, in the copolymeric chain, link the perfluoropolyether blocks to the hydrocarbon or heterocyclic radicals.

The polymeric elastomers having the structure of copolyimides described hereinabove are prepared by reacting the mixtures of α,α,ω,ω-tetrahydropolyoxaperfluoralkane-α,ω-diamines having structure (2):

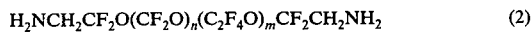

with a mixture of two or more different dianhydrides or of two or more different esters of tetracarboxylic acids (3)

wherein R is as above defined.

The molar ratio between the mixture of the monomers derived from tetracarboxylic acids (3) and the mixture of diaminic monomers (2) is comprised between 0.98 and 1.02.

When said ratio is very close to 1 between the two types of monomers, a perfluoropolyether unit and a unit derived from a tetracarboxylic dianhydride (3) alternate in the copolymeric chain. To this type of chemical composition is to be attributed the high degree of rotational freedom of the copolymeric chain from which derives the unusual very high flexibility of the copolymeric material having an elastomeric behavior at temperatures below even −80° C.

Examples of the structures of tetracarboxylic acids (3) used as monomers, which fall within the scope of this invention, are:

methane tetracetic acid; 1,1,2,2-ethane tetracarboxylic acid;
1,2,3,4-butane tetracarboxylic acid; 1,2,3,4-cyclobutane tetracarboxylic acid; 1,2,3,4-cyclopentane tetracarboxylic acid; dicyclo-(2,2,2)-octane-2,3,5,6-tetracarboxylic acid; 7,8-dichlorodicyclo-(2,2,2)-octane-2,3,5,6-tetracarboxylic acid; 7,8-diphenyldicyclo-(2,2,2)-octane-2,3,5,6-tetracarboxylic acid; dicyclo-(2,2,2)-octene-(7)-2,3,5,6-tetracarboxylic acid;
tricyclo-(4,2,2,0$^{2-5}$)-decene-(9)-3,4,7,8-tetracarboxylic acid; pyromellitic acid; phenyl-pyromellitic acid; benzophenone-3,3',4,4'-tetracarboxylic acid; diphenyl-3,3',4,4'-tetracarboxylic acid; 4,4'-sulphonyldiphthalic acid; 4,4'-sulphinyldiphthalic acid; 4,4'-oxydiphthalic acid; 4,4'-methylenediphthalic acid; 3,3'-isopropylidene diphthalic acid; naphthalene-1,4,5,8-tetracarboxylic acid; pyrazine-tetracarboxylic acid; pyrrolidine-2,3,4,5-tetracarboxylic acid; tetrahydrofuran-tetracarboxylic acid and thiophene-tetracarboxylic acid.

As regards the structure of the perfluoropolyether blocks constituting the mean repeating unit of formula (1), a minimum value of the sum $(n+m)$ of ether units —C$_2$F$_4$O— and —CF$_2$O— is required in order to obtain a polymeric material having elastomeric characteristics and which is either amorphous or exhibits a low percent of crystallinity.

It is surprising that by using a mixture of 2 or more different anhydrides according to the invention and limiting this change to low parts by weight stretches of the polymeric chain it was possible to obtain copolyimide products having the characteristics of elastic products which are then vulcanizable and capable of furnishing articles having dynamo-elastic properties typical of a rubber at both high and a very low temperatures, by using processing methods and technology employed in the rubber industry.

The obtainment of an elastomeric product according to this invention is conditioned by a suitable length of the perfluoropolyether blocks. In fact, it is only when the value of the sum $(n+m)$ is at least higher than 20 that it is possible to obtain a copolymer which is almost free of crystallinity or, in some cases, is completely amorphous as regards the structure and the respective molar ratios of the groups R, such copolymer being elastomeric and having high flexibility at very low temperatures.

Furthermore, a suitable length of the perfluoropolyether block in the repeating unit is necessary in order both to space the bis-cycloimide units from one another sufficiently and at the same time impart a high rotational degree to said perfluoropolyether segment, so as to prevent the generation of interactions of the intermolecular type, which generally originate undesirable crystallization phenomena, as well as an increase in the second order transition temperature. In fact, with increase in the length of the perfluoropolyether blocks, elastic polyimides are obtained which have an improved flexibility at low temperature and are completely amorphous.

Another and important measure which we have taken for reducing or eliminating the tendency of the polymeric chains to crystallize is to copolycondense the perfluoropolyether monomers in such a way as to limit or prevent a sequential order in each single chain and thus also prevent the occurrence of a crystalline structure.

Each of the two or more monomers derived from tetracarboxylic acids (3), which participate in the composition of the copolymeric structure (1), may be present in a molar ratio comprised between 5% and 95%, preferably between 25% and 75%, in respect to the total number of carboxylic monomeric units present.

On the other hand, it is necessary for the copolymeric chain to include a given amount of bis-cycloimide units linked to the perfluoropolyether blocks, since the bis-cycloimide units are responsible for the generation of the intermolecular cohesive forces which limit the viscous creep of the linear chains of the copolymer and thus impart the desired mechanicl resistance to it, and also make it possible to obtain adequate amounts of intermolecular crosslinking bonds during vulcanization of the copolymer. The presence of the proper amount of bis-cycloimide units can be achieved by suitably limiting the length of the perfluoropolyether blocks below the value corresponding to 200 of the ether units —C$_2$F$_4$O— and —CF$_2$O.

From the foregoing consideration of the preferable length of the perfluoropolyether blocks, it follows that another condition necessary for obtaining copolyimides according to this invention and having the stated characteristics is a low polydispersity index of the mixtures of functional fluorinated polyethers which are used as one of the two classes of monomers.

The polydispersity index is defined by the $\overline{Mw}/\overline{Mn}$ ratio, $\overline{Mw}$ being the weight average molecular weight, and $\overline{Mn}$ being the number average molecular weight of the mixture (P. J. Flory, "Polymer Chemistry," Ed. Cornell, New York, 1953, pages 273, 292).

For the present purposes, the preferred variability range of said $\overline{Mw}/\overline{Mn}$ ratio is comprised between 1.0 and 1.3.

The higher the polydispersity index of the mixture the higher the percentages of the functional fluorinated polyethers having the extreme molecular weight values in the molecular weight distribution range.

Consequently, if a high percent of fluorinated polyethers of lower molecular weight are present, the copolymer may comprise polymeric segments having a high content of bis-cycloimide groups capable of causing the separation of undesired crystal phases in the polymer and a reduction of the polymer flexibility at low temperatures.

Conversely, if fluorinated polyethers of high molecular weight are present in high percent, the product may comprise polymeric segments in which the content of bis-cycloimide units is so low that the mechanical properties of the polymer are affected adversely, and difficulty is experienced in effecting the cross-linking reactions during the vulcanization step.

Another structural characteristic of the perfluoropolyether blocks which determines the properties of the new elastomers is the $m/n$ ratio between ether units $-C_2F_4O-$ and $-CF_2O-$. To obtain elastomers which are highly flexible at low temperatures, it is advisable to use perfluoropolyether blocks in which the $C_2F_4O/CF_2O$ ratio is in the range from 0.2 to 5.0, preferably from 0.3 to 1.5.

The fluoropolyether diamines of formula (2) are obtained by reduction of the diamides of the polyoxaperfluoroalkandioic acids of formula (4):

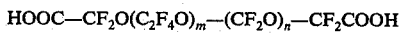

$$HOOC-CF_2O(C_2F_4O)_m-(CF_2O)_n-CF_2COOH$$

the preparation of which is described in Italian Pat. No. 817,809.

The conversion of the dicarboxyamide product $H_2N-OC-CF_2O-(C_2F_4O)_m-(CF_2O)_n-CF_2-CO-NH_2$ into dimethyleneaminic product $H_2N-H_2C-CF_2O-(C_2F_4O)_m-(CF_2O)_n-CF_2-CH_2-NH_2$ is obtained by reduction of the carboxyamide group with complex aluminum hydrides, such as lithium-aluminium hydride.

The degree of functionality of starting acids (4) is comprised between 1.4 and 1.999 in relation to a certain content of monofunctional acids having neutral terminal groups of the type $-CF_3$ and $-CF_2Cl$. In consequence, the degree of functionality of the fluorinated diamines remains of the corresponding order of magnitude, due to the high conversion of the carboxyamide group into the methyleneaminic group.

The functionality degree affects the degree of polymerization of polycondensation polymers. Therefore, to obtain polymers according to this invention which have the best molecular weights, it is necessary to reach the highest possible degree of conversion by conducting the polycondensation at a slow rate and at high reaction temperatures.

The polycondensation reaction is carried out by reacting fluorinated polyether diamines (2) with the mixture of tetracarboxylic acids (3) in the form of anhydrides or esters of the acids, by a two-step process which is known in general.

In the first step, the diamine is acylated by the tetracarboxylic derivative with formation of a polymer having the structure either of a polyamide - acid or a polyamide - ester. In accordance with our invention, said first step is conducted at a temperature comprised between 20° C and 150° C in the presence of a liquid mixture consisting of a fluorinated solvent, such as 1,1,2-trichlorotrifluoroethane, benzotrifluoride, hexafluoroxylene, and perfluoropropylpyran, with one or more polar solvents, such as, N,N-dimethylacetamide, N,N-dimethylformamide, methyl alcohol, phenol, dimethoxyethane, 2,5,8-trioxanonane, dimethylsulphoxide, N-methyl-2-pyrrolidone, tetramethylene sulphone and optionally in combination with other solvents such as benzene, chlorobenzene, polychlorobenzenes, xylenes, mesitylene etc.

The second reaction step involves the formation of imide rings, for example by cyclodehydration of the copolyamide acid. This reaction may be conducted in the presence of organic solvents. In this case, it is necessary that organic liquids having a boiling temperature between 150° C and 250° C be present, in order that the water formed stoichiometrically during the cyclization may be removed at said temperatures. Alternatively, the cyclodehydration reaction may be conducted in the absence of organic liquids, in which case it is necessary to isolate the copolyamide-acid polymer, obtained in the first step, from the solvents used, the separation of the polymer being preferably carried out by evaporation of the solvent or by precipitation of the copolymer from solutions. More precisely, the cyclization step of the imide rings is effected over a period of several hours, for example from 1 to 24 hours, by heating at temperatures ranging from 150° C to 300° C, under hard vacuum or in an inert gas atmosphere.

The copolymer obtained according to this invention and having the structure of the copolyimide formed by the repeating units represented by formula (1), surprisingly exhibits the characteristics of an elastic rubber, at high and low temperatures, moldable, soluble in suitable mixtures of organic liquids. These characteristics are unusual for the common polyimides generally described (see for instance N. A. Adrova, M. I. Bessonov, L. A. Laius, A. P. Rudakov, "Polyimides", Ed.IPST, Jerusalem 1969, Page 3.).

Said characteristics comprise, for instance, elastic modulus values around $10^7$ dynes/cm$^2$, elongation at break values higher than 500%, glass transition temperature values comprised between $-90°$ C and $-130°$ C, and often a complete absence of crystal phases in the material in the crude, non-vulcanized state.

The copolyimides may be cross-linked through chemical reactions among the polymeric chains, thus yielding elastomers which exhibit, besides characteristics of flexibility and elasticity at low temperatures, valuable properties of mechanical, thermal and chemical stability.

The cross-linking can be brought about according to the following method, taking into account the chemical structure of groups R forming part of the bis-cycloimide unit. Precisely, since the polymeric chain includes, in its structure, groups R belonging to the aliphatic or cycloaliphatic series of groups R of the aromatic and heterocylic series, substituted by groups belonging to the aliphatic or cycloaliphatic series, the cross-linking of the copolyimides may be suitably carried out with the aid of organic peroxide derivatives such as:

benzoyl peroxide, dicumyl peroxide, lauroyl peroxide, di-ter-butyl-peroxy-diisopropylbenzene, and ter-butyl-perbenzoate, at temperatures comprised between 70° and 200° C.

The cross-linking process is conducted either in the presence or not of a filler inert with respect to the polymer, such as: carbon black, silica, silicates, metal oxides such as ZnO, MgO.

The characteristics of flexibility at low temperatures of the elastomers, of their chemical stability and of thermal and thermal-oxidative resistance thereof render the vulcanized elastomers suitable for applications wherein the classical rubbers are not suitable in the range of temperatures of from −130° to +300° C. Said materials can be used in the chemical, petroleum, mechanical auto and aviation industries as gaskets, joints and elastic membranes.

The following examples are given to further illustrate the invention and are not intended to be limiting.

EXAMPLE 1

The copolyimide described in this example was obtained by polycondensing a mixture of the dianhydride of dicyclo-(2,2,2)-octene-(7)-2,3,5,6-tetracarboxylic acid and of 4,4'-methylene-diphthalic acid in a 75:25 molar ratio, with a mixture of diamines having a structure corresponding to formula (2) hereinabove and an equivalent weight comprised between 800 and 1800, as determined through separation by fractional precipitation of the diamines mixture from a 5% solution in 1,1,2-trichlorotrifluoroethane due to addition of $CH_2Cl_2$. The mixture was characterized by an average equivalent weight of 1485, as determined by direct acidimetric titration, by a $\overline{M}w/\overline{M}n$ polidispersity index of 1.25, while NMR spectroscopic analysis indicated a functionality degree of 1.93 and a ratio between ether units $C_2F_4O/CF_2O$ of 0.6.

The diamines mixture was obtained by reducing through lithium-aluminium hydride — a mixture of diamides of the polyoxaperfluoroalkandioic acids as represented by formula (4) above, having an average equivalent weight of 1530 — as determined by saponification with alkali and by indirect alkalimetric titration.

Into a 3-necked pyrex flask having a 2 liter capacity, fitted with stirrer, dipping pipe for the gas inlet, and reflux condenser cooled by a freezing mixture to 0° C, immersed in an ice bath, containing 500 g of methyl diesters of the polyoxaperfluoroalkandioic acids, having an average equivalent weight of 1530, dissolved in a mixture containing 900 ml of 1,1,2-trichlorotrifluoroethane and 600 ml of ethyl ether, there was bubbled an anhydrous ammonia flow, for 2 hours with a 10 l/h flowrate. After a 2-hour reaction under stirring, the reaction mixture was brought to room temperature and the solvents were then evaporated under vacuum at a temperature of 30° - 40° C.

The diamides mixture thus obtained was transferred and admixed, in 6 hours, by means of a dropping funnel, into a 3-necked glass flask having a 3 liter capacity, fitted with stirrer and reflux condenser, immersed in a bath thermoregulated at 0° C, and containing 19 g of $LiAlH_4$ suspended in a mixture consisting of 1 liter of anhydrous ethyl ether and of 0.5 liter of 1,1,2-trichlorotrifluoroethane.

The reaction was conducted for a further 4 hours under stirring, at room temperature. The flask was cooled again down to 0° C and 500 ml of a tetrahydrofuran solution at 15% of $H_2O$ were dripped thereinto in two hours. A salt solid separated from the organic solution. It was treated with 300 ml of a 20% aqueous solution of NaOH until dissolution. The diamines mixture was then separated by repeated extractions with amounts of 200 ml of 1,1,2-trichlorotrifluoroethane.

The organic solutions were collected, in ethyl ether and in 1,1,2-trichlorotrifluoroethane, the solvents were evaporated by distillation and the residue was filtered on a kieselguhr layer, thus obtaining 450 g of a diamine having an average equivalent weight of 1485 and the characteristics described hereinbefore.

A solution of 270 g of said diamine (equivalent weight = 1485) in a mixture consisting of 120 ml of 1,1,2-trichloritrifluoroethane and of 80 ml of N,N-dimethylacetamide, contained in a 3-necked pyrex flask having a capacity of 1 liter, fitted with reflux condenser, thermometer and mechanical stirrer, thermoregulated at 30° C, was admixed, in 10 minutes, with a mixture containing 16.9 g of the dianhydride of dicyclo-(2,2,2)-octene-(7)-2,3,5,6-tetracarboxylic acid and 7 g of 4,4'-methylene diphthalic anhydride.

The mixture was reacted under stirring at 30° C for 1 hour, during which time the solution became very viscous. The reflux cooler was then replaced by a Claisen condenser connected to a 250 ml branched test tube, and the solvents were evaporated by distillation under vacuum at 50° C.

Subsequently, a weak pure nitrogen flow was introduced into the flask, while a residual pressure of 1 mm Hg was kept inside the flask by means of a vacuum mechanical pump. The temperature was then raised to 240° C in 2 hours and the reaction was carried on under these conditions for a further 5 hours.

A solid copolymer was thus obtained having elastic properties and an inherent viscosity value equal to 0.52 dl/g, as determined at 30° C in a 0.3% solution of a mixture of 1,1,2-trichlorotrifluoroethane and methanol (ratio by volume = 9:1).

Copolymer samples subjected to differential calorimetric analysis under a thermoanalyzer Du Pont 900 exhibited an evident phenomenon of glass transition at −122° C, while no 1st order transition phenomena could be observed; by thermogravimetric analysis it was possible to determine a thermal decomposition threshold of the polymer in nitrogen at 390° C (corresponding to a loss ($\Delta$ P/P) % = −2, at a heating rate of 2° C/min.)

A mixture was prepared made up of the copolymer (100 parts), MT carbon black (20 parts), di-terbutyl-peroxy-diisopropylbenzene (5 parts), and samples of this mixture were vulcanized at a temperature of 160° C for 2 hours under a 5 ton load and then for further 8 hours in a forced ventilation oven at 160° C, to obtain laminas having elastomeric properties.

On test pieces of said vulcanized material, by operating according to standards ASTM D412-41, it was possible to determine at 23° C a tensile strength of 105 kg/cm², an elongation at break of 500% and an elastic modulus of about $2 \times 10^7$ dynes/cm², these values having been obtained under a Rheovibron by forced oscillation at a frequency of 3.5 Hz. The value of the modulus was still of the order of $10^8$ dynes/cm² at −56° C. On the lamina of the vulcanized product an elongation at break of 460% at −70° C was determined. The laminas of the vulcanized product exhibited on the thermogravimetric analysis a decomposition threshold in air at 360° C (($\Delta$ P/P) % = −2, heating rate = 2° C/min.).

The measure of compression set was carried out on a sample of vulcanized elastomer, using the indication of ASTM D-395-55, method B, by subjecting the sample to a compression at 200° C for 7 days. The value of the compression set was of 31% showing a weak permanent deformation of the compression at high temperature over the said period. The resistance to swelling in oil type ASTM No. 3 was determined on the samples of the vulcanized elastomer, operating according to ASTM D 471-57T. The samples were kept submerged in oil 7 days at 150° C. At the end, they were washed and dried and showed an average increase in volume of 1.5%. Furthermore, the samples were found to have maintained about 90% of the tensile strength of the vulcanizate as compared to that of the vulcanizate not subjected to testing.

A series of O-rings having a i.d. of 123.4 mm. and a width of 3.5 mm. was prepared using the elastomer vulcanized as described above. The rings were used as gaskets for two stainless steel blank flanges which were closing a stainless steel tube having a DN of 100 mm. The tube was fitted with inlet and outlet lines for the circulation of fluid. Oil of type ASTM 3 was circulated in the tube continuously at 200° C for 28 weeks without noting any loss of oil through the flanges. At the end, the flanges were disconnected to recover the two rings, which were shown to have maintained 70% of this initial tensile strength. The test of compression set and of oil resistance as well as the experiment above described showed the excellent behaviour of the vulcanized elastomer as material suitable for example for manufacturing gaskets, tubes, and foils for special uses at high temperatures.

EXAMPLE 2

This example illustrates the synthesis of the copolyimide, obtained from a mixture of the dianhydrides of pyromellitic acid and of dicyclo-[2,2,2]-octene-(7)-2,3,5,6-tetracarboxylic acid, in a 95:5 molar ratio, with a mixture of diamines, having an equivalent weight comprised between 1000 and 1600, as determined through separation by fractional precipitation from a 5% solution in 1,1,2-trichlorotrifluoroethane by admixture with $CH_2Cl_2$. Said mixture is characterized by an average equivalent weight equal to 1324, a $\overline{M}w/\overline{M}n$ polydispersity index of 1.2, a functionality degree of 1.95 and a ratio between ether units $C_2F_4O/CF_2O$ equal to 0.07, as resulting from the NMR spectroscopic analysis.

The mixture of diamines was obtained by reduction through lithium-aluminium hydride of a mixture of diamides of the polyoxaperfluoroalkandioic acids represented by formula (4) having an average equivalent weight of 1350; the preparation of the diamides of said acids starting from the corresponding diesters, and the reduction, separation and purification of the diamines were effected by using the equipment and method described in Example 1, thus obtaining comparable conversion yields.

The polycondensation was conducted in a 500 ml pyrex glass flask fitted with reflux condenser, stirrer and immersed in a bath thermoregulated at 30° C. In the flask containing a solution made up of 61 g of the mixture of diamines having an average equivalent weight of 1324, of 140 ml of 1,1,2-trichlorotrifluoroethane, and of 60 ml of N,N-dimethylacetamide, was added and admixed under stirring a mixture containing 4.8 g of pyromellitic anhydride and 0.28 g of dianhydride of the dicyclo-octene-tetracarboxylic acid.

The mixture was reacted under stirring for 2 hours at room temperature, the solvents were then removed from the copolymer by evaporation under vacuum by heating to about 50° C.

Subsequently, a weak pure nitrogen flow was sent into the flask, while an absolute pressure of 1 mm Hg was maintained in the reactor inside by means of a vacuum mechanical pump. Then the temperature was brought to 250° C in 2 hours and the reaction was carried on for a further 4 hours.

A solid copolymer was thus obtained exhibiting elastomeric properties and an inherent viscosity of 0.58 dl/g, as determined at 30° C in a 0.6% solution of the polymer in a mixture of 1,1,2-trichlorotrifluoroethane and N,N-dimethylformamide (ratio by vol. = 9:1).

Such copolymer was characterized by a thermal decomposition threshold in nitrogen at 390° C (($\Delta$ P/P) % = $-2$; heating rate = 2° C/min.), as determined by thermogravimetric analysis under a thermoanalyzer Du Pont 900. A sample of the copolymer (100 parts) charged with MT carbon black (20 parts) and with di-terbutylperoxy-diisopropylbenzene (6 parts) was vulcanized by heating for 2 hours at 160° C under a 5 ton load and by successive heating for 8 hours at 160° C, thus obtaining laminas of the product having elastomeric properties and exhibiting, on differential calorimetric analysis, an evident 2nd order transition phenomenon at 115° C and a slight 1st order transition phenomenon at approx. 45° – 50° C.

By operating according to standards ASTM D412-41 it was possible to determine on the laminas of the vulcanized product at 23° C a tensile strength of 85 kg/cm$^2$ and an elongation at break of 550%. On the laminas of the vulcanized product it was determined an elastic modulus of $3.5 \times 10^7$ dynes/cm$^2$, these values having been obtained under a Rheovibron at room temperature by forced oscillation at a frequency of 3.5 Hz. Furthermore, after immersion in solvent at 25° C for 7 days, the following swelling characteristics ($\Delta V/V\%$) were determined:

0.5% in benzene; +0.5% in heptane; +3% in 1,1,2-trichlorotrifluoroethane; +2% in HCl at 35%; +2.5% in $NH_3$ at 30%; +10% in methylethylketone.

EXAMPLE 3

This example illustrates the copolyimide obtained from a diamine mixture having an average equivalent weight of 1324 — already described in Example 2 — by condensation with a mixture formed by dianhydrides of pyromellitic acid and of dicyclo-[2,2,2]-octene-(7)-2,3,5,6-tetracarboxylic acid in equimolar ratio to each other.

By operating with the same equipment and according to the same polymerization method as described in Example 2, 123.4 g of the fluoropolyether diamines mixture, dissolved in a mixture consisting of 1,1,2-trichloro-trifluoroethane and of 80 ml of N,N-dimethylacetamide, were polymerized in a 500 ml flask at 30° C for 2 hours with a mixture made up of pyromellitic dianhydride (5.08 g) and of the dianhydride of dicyclo-octene-tetracarboxylic acid (5.77 g).

After evaporation of the solvents under vacuum, the polymerization was continued for 5 hours at 250° C, thus obtaining an elastic copolymer having an inherent viscosity of 0.5 dl/g determined at 30° C according to the method described in Example 2. Copolymer samples revealed, on the calorimetric analysis, an evident 2nd order transition phenomenon at $-120°$ C and traces of a 1st order transition phenomenon at 35° – 40° C. Copolymer samples, subjected to thermogravimetric analysis, exhibited a thermal decomposition threshold in nitrogen at 385° C (($\Delta$ P/P) % = $-2$, 2° C/min.).

A mixture of the copolymer (100 parts) with MT carbon black (20 parts) and diterbutylperoxy-diisopropylbenzene (4 parts), vulcanized at 160° C according to the method described in Example 2, yielded laminas of good elastomeric characteristics which, on calorimetric analysis, did not exhibit any 1st order transition phenomena showing that the copolymer was amorphous. A tensile strength of 90 kg/cm$^2$ and an elongation at break of 530% were determined on the samples of the vulcanized material, said elongation at break being still of 480% at −70° C. On the laminas of the vulcanized product it was determined an elastic modulus of 1.5×10$^7$ dynes/cm$^2$ obtained at room temperature under a Rheovibron by forced oscillation at a frequency of 3.5 Hz.

EXAMPLE 4

This example describes the copolyimide obtained from a mixture of dianhydrides of pyromellitic acid and dicyclo-(2,2,2)-octane-2,3,5,6-tetracarboxylic acid in equimolar ratios, by polycondensation with a mixture of polyfluoropolyether diamines having an equivalent weight between 800 and 1500 and characterized by an average equivalent weight of 1270, a polydispersity index of 1.25, a functionality degree of 1.94 and a ratio between ether units $C_2F_4O/CF_2O$ of 0.5, as determined by NMR spectroscopic analysis.

The diamines mixture had been obtained according to the preparation method and the operative modalities described in Example 1, starting from the methyl diesters of the polyoxaperfluoroalkandioic acids represented by formula (4), having an average equivalent weight of 1290. Polycondensation was conducted in the glass equipment of the type described in Example 3, according to the same operative modalities.

114.5 g of fluorinated diamines dissolved in a mixture consisting of 100 ml of 1,1,2-trichlorotrifluoroethane and of 40ml of N,N-dimethylacetamide, contained in a reactor thermoregulated at 30° C. were admixed, under stirring, with a mixture formed by 4.9 g of the dianhydride of pyromellitic acid and by 5.62 g of the dianhydride of dicyclo-octane-tetracarboxylic acid.

The whole was reacted, under stirring, at 30° C for 1 hour, the solvents were evaporated by distillation under vacuum at 50° C and the reaction was then carried on for 8 hours at 240° C under dynamic vacuum at an absolute pressure of 1 mm Hg.

The solid copolymer obtained exhibited elastic properties and an inherent viscosity of 0.45 dl/g, as determined at 30° C in a 0.8% solution in a mixture of 1,1,2-trichlorotrifluoroethane and methanol (ratio by volume = 9:1).

On copolymer samples subjected to thermogravimetric analysis it was possible to determine a decomposition threshold in air at 380° C ((Δ P/P) % = −2, 10° C/min.); the differential calorimetric analysis permitted to determine a 2nd order transition temperature of −120° C as well as a very slight phenomenon of 1st order transition at about 35° − 40° C.

A sample of the copolymer (100 parts), charged with MT carbon black (20 parts) and with di-ter-butyl-peroxy-diisopropylbenzene (9 parts), vulcanized at 160° C according to the modalities described in Example 2, yielded elastic laminas characterized by a tensile strength at 23° C of 100 kg/cm$^2$, and elongation at break of 600%, a deformation at break (DR$_{10}$) of 2%, and I.R.H.D. hardness corresponding to 65°. On the laminas of the vulcanized product it was determined an elastic modulus of 2×10$^7$ dynes/cm$^2$ obtained at room temperature under a Rheovibron by forced oscillation at a frequency of 3.5 Hz.

Laminas of the product vulcanized as described hereinbefore, age at a temperature of 250° C in an oven ventilated by air circulation revealed, after 72 hours, a weight loss lower than 2%, while the properties of mechanical stability at 23° C remain unchanged. The calorimetric analysis revealed no 1st order transition phenomena.

EXAMPLE 5

This example illustrates the copolyimide obtained from the equimolar mixture of dianhydride of tricyclo-(4,2,2,0$^{2-5}$)-decene-(9)-3,4,7,8-tetracarboxylic acid and of 4,4'-sulphonyldiphthalic acid, by polycondensation with the mixture of polyfluoropolyether diamines having an average equivalent weight of 1324, described in Example 2.

A mixture of 5.48 g of dianhydride of tricyclo-decene-tetracarboxylic acid and 7.16 g of 4,4'-sulphonyldiphthalic dyanhydride were introduced into a 3-necked flask of 500 ml capacity, fitted with reflux condenser and stirrer, immersed in a bath thermoregulated at 30° C, containing a solution consisting of 106 g of the fluorinated diamines mixture in 150 ml of 1,1,2-trichlorotrifluoroethane and 100 ml of N,N-dimethylformamide. The reaction was conducted for 2 hours at 30° C; subsequently, according to the method already described, the solvents were evaporated by distillation under vaccum at 50° C; the polymerization was carried on for further 3 hours at 240° C in a nitrogen atmosphere at an absolute pressure of 1 mm Hg by connecting the flask to the vacuum line.

The polymer thus obtained was characterized by marked elastic properties and by an inherent viscosity of 0.50 dl/g, determined at 30° C in a 0.8% solution in a mixture of 1,1,2-trichlorotrifluoroethane and methanol (ratio by vol. = 5:1). The copolymer, after crosslinking brought about by di-terbutylperoxy-diisopropylbenzene at 160° C and annealing at such temperature for 4 hours, exhibited an evident phenomenon of 2nd order transition at −116° C.

On the laminas of the vulcanized product it was determined at room temperature an elastic modulus of 4×10$^7$ dynes/cm$^2$ under a Rheovibron by forced oscillation at a frequency of 3.5 Hz. Furthermore, it was determined an elongation at break of 530% at room temperature and of 470% at a temperature of −70° C.

EXAMPLE 6

The copolyimide described in this example was obtained from the mixture of polyfluoropolyether diamines having an average equivalent weight of 1324, described in Example 2, by polycondensation with an equimolar mixture of the dianhydrides of 1,1,2,2-ethane tetracarboxylic acid and of 1,2,3,4-cyclopentanetetracarboxylic acid.

69 g of the fluorinated diamine dissolved in a mixture consisting of 120 ml of 1,1,2-trichlorotrifluoroethane and of 40 ml of N,N-dimethyl-formamide, contained in a 3-necked pyrex glass flask having a capacity of 250 ml, fitted with reflux condenser and stirrer, and immersed in a bath thermoregulated at 30° C, were admixed with a mixture consisting of 2.21 g of ethanetetracarboxylic acid dianhydride and of 2.74 g of cyclopentane-tetracarboxylic anhydride; the whole was reacted under stirring for 2 hours at 30° C.

The polycondensation was then carried on for further 3 hours at 220° C, according to the method already described.

The copolymer obtained was an amorphous solid - as resulting on differential calorimetric analysis - and was characterized by an inherent viscosity of 0.35 dl/g, as determined at 30° C in a 0.5% solution of the polymer in a mixture of 1,1,2-trichlorotrifluoroethane and of N,N-dimethylformamide (ratio by vol. = 4:1).

Copolymer samples examined under thermoanalyzer Du Pont 900 exhibited a thermal decomposition threshold in nitrogen at 360° C ((Δ P/P) % = −2, 10° C/min.).

Samples of the copolymer (100 parts), after vulcanization at 160° C for 2 hours, in the presence of silica Ultrasil VN3 (20 parts) and of diterbutylperoxy-diisopropylbenzene (6 parts), exhibited a tensile strength of 80 kg/cm$^2$ and an elongation at break of 600% at room temperature.

On the laminas of the vulcanized product it was determined at room temperature an elastic modulus of $1.7 \times 10^7$ dynes/cm$^2$ under a Rheovibron by forced oscillation at a frequency of 3.5 Hz.

We claim:

1. Elastomeric vulcanizable copolymers of (A) a mixture of two or more comonomers derived from tetracarboxylic acids and (B) a mixture of α, α, ω, ω-tetrahydropolyoxaperfluoroalkane-α, ω-diamine comonomers, the molar ratio of (A) to (B) being comprised between 0.98 and 1.02, in which the polydispersity index of (B) defined by the $\overline{Mw}/\overline{Mn}$ ratio, wherein $\overline{Mw}$ is the weight average molecular weight and $\overline{Mn}$ is the number average molecular weight of the mixture, is comprised between 1 and 1.3, the macromolecular perfluoropolyether and copolyimide chain of said elastomeric copolymers being made of repeating units:

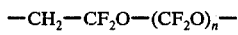

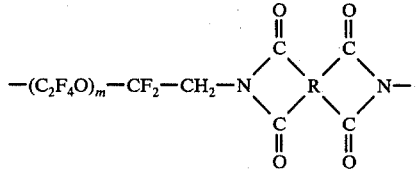

wherein C$_2$F$_4$ represents a group obtained by opening of the double bond of a tetrafluoroethylene molecule; —C$_2$F$_4$O— and —CF$_2$O— are oxyperfluoroalkylene units randomly distributed along the chain, the m/n ratio of which is comprised between 0.2 and 5; n and m are whole numbers from 4 to 100, the sum n+m is a whole number from 20 to 200, radicals R are organic tetravalent groups representing at least two different structures randomly distributed along the chain and selected from the group consisting of aliphatic hydrocarbon radicals containing from 2 to 18 carbon atoms; halogen substituted aliphatic radicals containing from 2 to 18 carbon atoms; alkyl-substituted aliphatic radicals containing from 2 to 18 carbon atoms; alicyclic mono- or non-aromatic polycyclic radicals containing from 4 to 12 arbon atoms; mono- or polycyclic radicals substituted by halogen, alkyl, phenyl, alkylene or vinylene groups; aromatic, alkyl-aromatic and condensed-rings aromatic radicals; aromatic radicals consisting of two or more benzene rings linked together directly or through O, S, NH, CO, SO, SO$_2$, an alkylene, alkylidene or vinylene bridge; such radicals in which the benzene rings are halogen-substituted and such radicals in which the benzene rings are phenyl-substituted; and heterocyclic radicals the ring of which is made up of 5 or 6 atoms, provided that at least one of said radicals R is selected from the group consisting of aliphatic radicals, cycloaliphatic radicals, aliphatic- substituted aromatic radicals and cycloaliphatic-substituted aromatic radicals.

2. Elastomeric copolymers according to claim 1, wherein the m/n ratio is comprised between 0.3 and 1.5.

3. The process for preparing copolyimide copolymers according to claim 1, which comprises condensing a mixture of fluorinated polyether diamines having the general formula

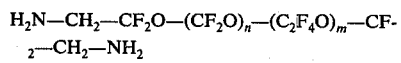

with two or more dianhydrides or esters of tetracarboxylic acids having the formula

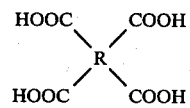

wherein R has the same meaning as in claim 1, which process comprises (I) reacting the diamines mixture with two or more of the tetracarboxylic monomers at a temperature from 20° C to 150° C, in the presence of a fluorinated solvent in combination with an organic solvent and (II) carrying on the polycondensation reaction under formation of imide rings by cyclodehydration of the polyamideacid copolymer obtained in step (I) by heating the product of step (I) to temperatures of from 150° C to 300° C under hard vacuum or in an inert gas atmosphere.

4. Elastomeric copolymers according to claim 1, in which each of the two or more comonomers derived from the tetracarboxylic acids contained in the copolyimide structure is present in a molar ratio ranging from 5% to 95%, with respect to the total amount of carboxylic monomeric units.

5. Elastomeric copolymers according to claim 1, in which each of the two or more comonomers derived from the tetracraboxylic acids contained in the copolyimide structure is present in a molar ratio ranging from 25% to 75% with respect to the total amount of carboxylic monomeric units.

6. The process of claim 3, in which at least one of the dianhydrides is selected from the group consisting of 1,1,2,2-ethane tetracarboxylic acid dianhydride, 1,2,3,4-butane tetracarboxylic acid dianhydride, 1,2,3,4-cyclobutane tetracarboxylic acid dianhydride, 1,2,3,3-cyclopentane tetracarboxylic acid dianhydride, dicyclo-(2,2,2)-octane-2,3,5,6-tetracarboxylic acid dianhydride, 7,8-dichlorodicyclo-(2,2,2)-octane-2,3,5,6-tetracarboxylic acid dianhydride, 7,8-diphenyldicyclo-(2,2,2)-octene-2,3,5,6-tetracarboxylic acid dianhydride, dicyclo-(2,2,2)-octene-(7)-2,3,5,6-tetracarboxylic acid dianhydride and tricyclo-(4,2,2,0$^{2-5}$)-decene-(9)-3,4,7,8-tetracarboxylic acid dianhydride.

7. The process according to claim 3 wherein the mixture of organic solvents is selected from the group consisting of 1,1,2-trichlorotrifluoroethane, benzotrifluoride, hexafluoroxylene, perfluoropropylpyran, N,N-dimethylacetamide, N,N-dimethylformamide, methanol, phenol, dimethoxy-ethane, 2,5,8-trioxanonane, dimethylsulphoxide, N-methyl-2-pyrrolidone and tetramethylen-sulphone, and mixtures thereof with solvents selected from the group consisting of benzene, chlorobenzene, polychloro-benzenes, xylenes and mesitylen.

8. The process according to claim 3, wherein, after the polycondensation, the elastomeric copolymer is cross-linked with an organic peroxide at temperatures comprised between 70° and 220° C.

9. The process according to claim 3, in which the mixture of fluorinated polyether diamines having the general formula $$H_2N-CH_2-CF_2O-(C_2F_4O)_m-(CF_2O)_n-CF_2-CH_2-NH_2$$

is obtained by reducing with a complex hydride of aluminum and lithium the polyether mixture having at both ends terminal carboxyamide groups, the general formula of which is:

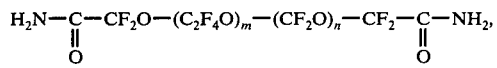

the reduction being effected in the presence of mixtures of ethyl ether and of 1,1,2-trichlorotrifluoroethane.

10. Elastomer copolymers according to claim 1, vulcanized with an organic peroxide.

* * * * *

UNITED STATES PATENT AND TRADEMARK OFFICE
CERTIFICATE OF CORRECTION

PATENT NO. : 4,080,319
DATED : March 21, 1978
INVENTOR(S) : Gerardo CAPORICCIO et al It is certified that error appears in the above—identified patent and that said Letters Patent is hereby corrected as shown below:

At Col. 1 of the patent, between the title of the invention,

"Elastomeric Copolymides Containing Fluorine And Process For Preparing Same", and the heading "The Prior Art" the following paragraph should appear:

- - - This is a continuation-in-part of our application Serial No. 381,809 filed July 23, 1973, now abandoned. - - -

Signed and Sealed this

Seventeenth Day of March 1981

[SEAL]

Attest:

RENE D. TEGTMEYER

Attesting Officer  Acting Commissioner of Patents and Trademarks